(12) United States Patent
Bohman

(10) Patent No.: US 8,807,602 B2
(45) Date of Patent: Aug. 19, 2014

(54) FLUID COUPLING ASSEMBLY

(75) Inventor: Peter Bohman, Skövde (SE)

(73) Assignee: CEJN AB (SE)

( * ) Notice: Subject to any disclaimer, the term of this patent is extended or adjusted under 35 U.S.C. 154(b) by 258 days.

(21) Appl. No.: 13/127,488

(22) PCT Filed: Nov. 5, 2009

(86) PCT No.: PCT/EP2009/064704
§ 371 (c)(1),
(2), (4) Date: Jul. 20, 2011

(87) PCT Pub. No.: WO2010/052277
PCT Pub. Date: May 14, 2010

(65) Prior Publication Data
US 2011/0272937 A1 Nov. 10, 2011

(30) Foreign Application Priority Data

Nov. 6, 2008 (EP) ..................................... 08168530

(51) Int. Cl.
*F16L 37/14* (2006.01)
(52) U.S. Cl.
USPC .......................................................... 285/309
(58) Field of Classification Search
USPC ............... 285/26, 29, 38, 308, 309, 311, 312, 285/922; 137/614, 614.01, 614.02, 614.03, 137/614.04, 614.11; 29/238, 243.55, 29/243.56
See application file for complete search history.

(56) References Cited

U.S. PATENT DOCUMENTS

| | | | | |
|---|---|---|---|---|
| 935,587 A * | 9/1909 | Casey | ........................... | 285/311 |
| 1,062,730 A * | 5/1913 | Poppert | ............................. | 285/8 |
| 2,421,178 A * | 5/1947 | Baker et al. | ................... | 285/311 |
| 3,664,375 A * | 5/1972 | Marette | .................... | 137/614.04 |
| 4,615,546 A * | 10/1986 | Nash et al. | ...................... | 285/26 |
| 4,915,419 A * | 4/1990 | Smith, III | ........................ | 285/26 |
| 5,316,347 A * | 5/1994 | Arosio | ............................. | 285/26 |
| 5,984,371 A * | 11/1999 | Mailleux | .......................... | 285/26 |
| 6,443,498 B1 * | 9/2002 | Liao | ........................... | 285/124.1 |

FOREIGN PATENT DOCUMENTS

| | | |
|---|---|---|
| DE | 4222193 A1 | 1/1993 |
| DE | 102006060005 A1 | 10/2007 |
| DE | 202008008692 U1 | 10/2008 |
| EP | 390715 A1 * 10/1990 | .............. F16L 37/56 |
| FR | 2882804 A1 | 9/2006 |
| GB | 2224325 A | 5/1990 |

OTHER PUBLICATIONS

"European Patent No. EP 2184526B1, published Jan. 4, 2012", 85 pgs.

* cited by examiner

*Primary Examiner* — Daniel P Stodola
*Assistant Examiner* — James Linford
(74) *Attorney, Agent, or Firm* — Schwegman, Lundberg & Woessner, P.A.

(57) ABSTRACT

A high pressure fluid coupling assembly comprises a nipple with a neck to be held in a yoke, which is pulled towards a socket box by a lever mechanism. When the nipple is pulled into complete engagement with the socket, the final downward movement of the lever pushes a locking plate into locking engagement with the distal ends of guide bolts, evenly distributed about the nipple and extending from the yoke and sliding through the socket box to the locking plate, which is in contact with the side of the socket box facing away from the yoke.

10 Claims, 5 Drawing Sheets

FLUID COUPLING ASSEMBLY

CROSS REFERENCE TO RELATED APPLICATIONS

This application is a National Phase Application of International Application PCT/EP2009/064704, filed 5 Nov. 2009, designating the United States of America, which claims priority to European Patent Application No. 08168530.7, filed Nov. 6, 2008, wich applications are incorporated herein fully by this reference.

TECHNICAL FIELD

Background Art

High pressure fluid couplings when closed usually are subjected to extreme forces on the closing mechanism and its arms during use. Demolition machines, hydraulic hammers and mining machines often use large diameter hoses (≥1"=26 mm) and routinely develop pressures of up to 350 bar during use. This puts enormous forces on the arms and joints of the closing mechanism resulting either in failure in the joints or bending of the arms or extremely bulky dimensioning of the arms and joints.

SUMMARY OF THE INVENTION

The present invention relates to a high pressure fluid coupling assembly.

The present invention intends to avoid the problems of excessive force on the arms and joints of the closing mechanism of the coupling, when the nipple and socket are fully engaged and the system is fully pressurized creating a force tending to separate the nipple from the socket. This is achieved by a high pressure fluid coupling assembly. An assembly of this type provides a secure locking of the nipple in the socket. According to a preferred embodiment the load, when the coupling is under pressure, is transferred from the closing mechanism to the locking plate and the distributed guide bolts. According to other preferred embodiments of the invention, the locking plate is engaged with the narrower neck portions of the guide bolts in a particularly simple, efficient and effective manner, simplifying engagement and disengagement and providing optimal taking up of the forces tending to separate the nipple from the socket when the system is under high fluid pressure. The preferred embodiments allow the closing mechanism to be dimensioned in a less bulky and more functional manner since the closing mechanism and its joints will not be subjected to excessive forces when the system is fully pressurized.

BRIEF DESCRIPTION OF THE DRAWINGS

The invention will now be described with reference to an illustrative example shown in the accompanying figures of which.

DETAILED DESCRIPTION

Figure 1A:
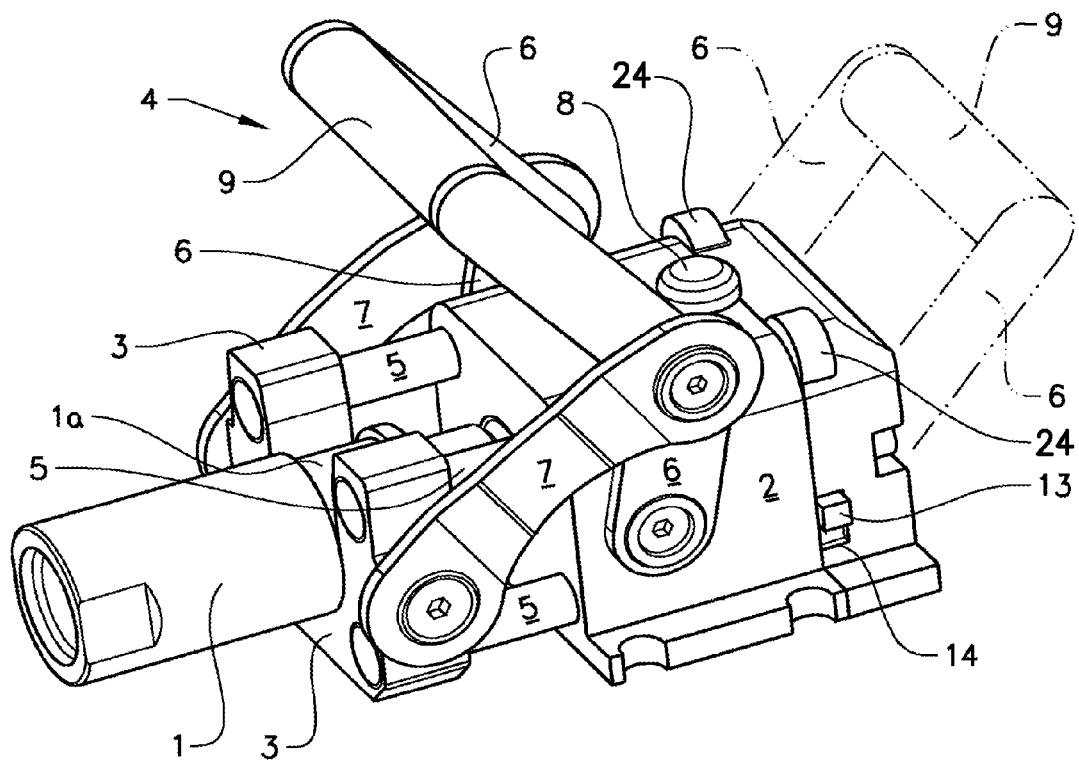
FIG. 1A shows the assembly of the invention with the nipple resting in the yoke in a state prior to coupling to the socket.

The invention will be described with reference here to a single non-limiting illustrative example, where the same reference numerals are used for the same parts in the various views.

Figure 1B:
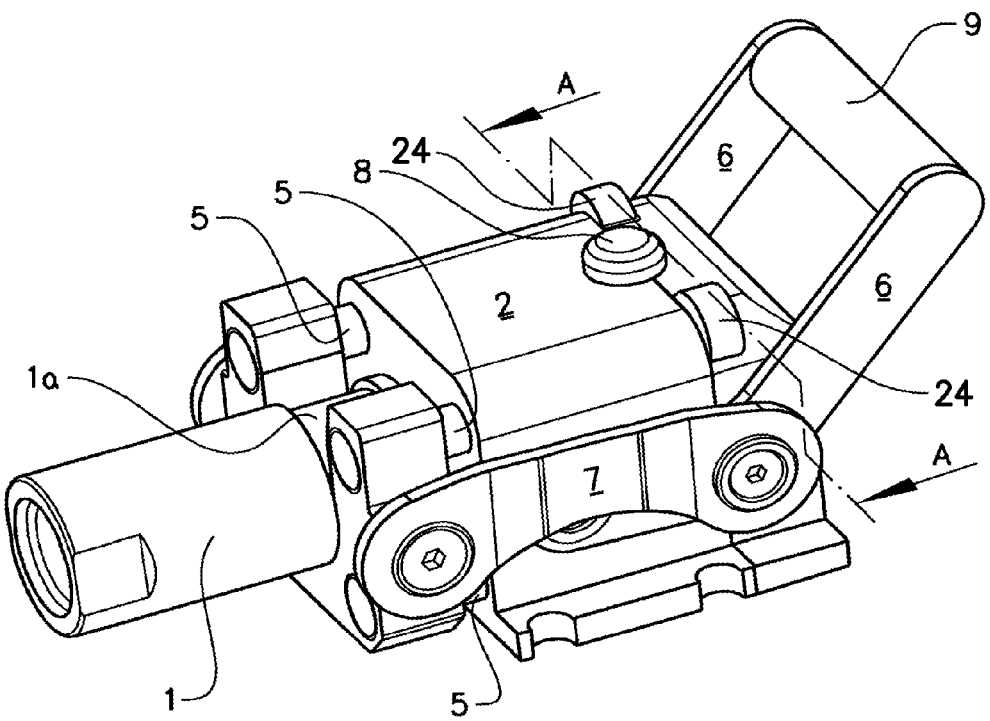
FIG. 1B shows the assembly of the invention with the nipple and the socket in a fully coupled state.

FIG. 1A shows a fluid coupling according to the invention where a typical fluid coupling nipple 1 on a hose (not shown) has been placed with its neck 1a of smaller diameter in a yoke 3 having a slot of minimally larger inner diameter than the diameter of the neck 1a. A socket box 2 connects to a further hydraulic line (not shown in FIGS. 1-2). The yoke 3 has four guide bolts 5 symmetrically distributed about the central axis of the assembly. The four guide bolts 5 extend through the box 2. The nipple 1 held in the yoke 3 is moved to its fully coupled state by pulling the lever 6 of the mechanism 4 to the right as shown in the figures to the position shown in FIG. 1B, with the yoke 3 retracted against the box 2. The connecting arm 7 between the lever 6 and the yoke 3 will be in a horizontal position in the fully coupled state.

Figure 2A:
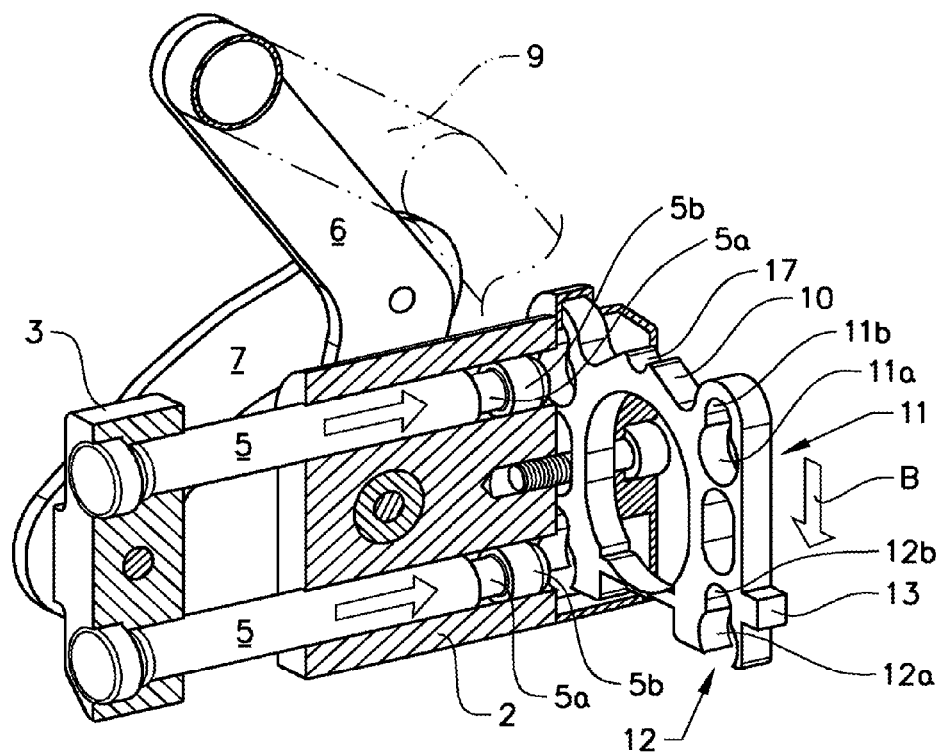
FIGS. 2A and 2B show longitudinally sectioned partial views of the assemblies in decoupled and coupled states respectively, corresponding to FIGS. 1A and 1B respectively.
Figure 2B:
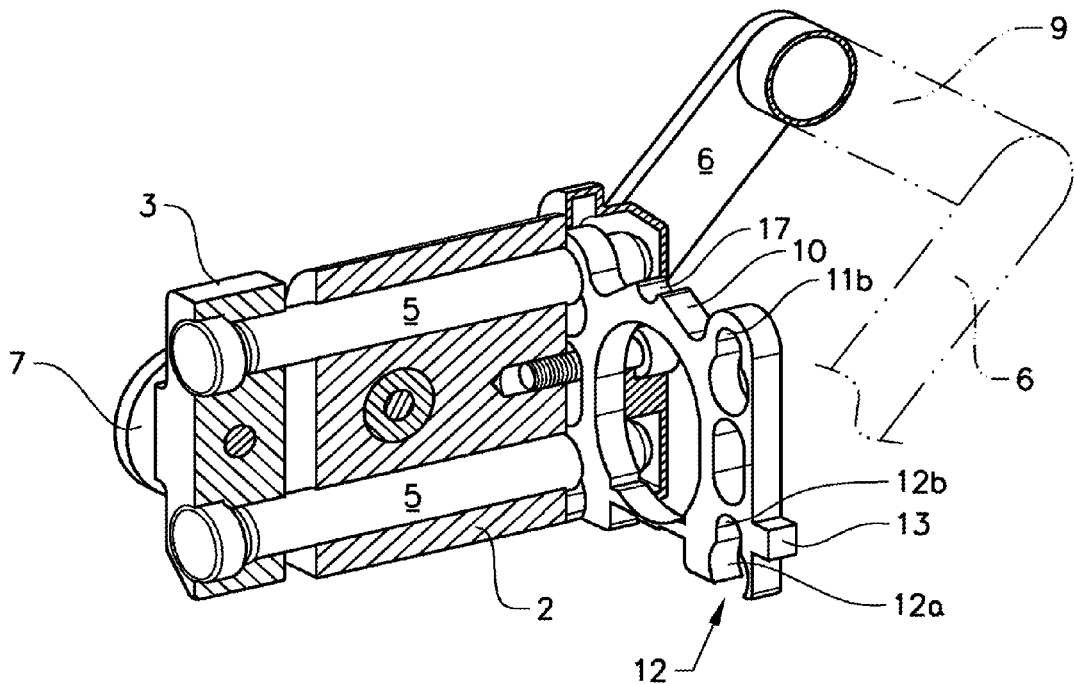
Figure 4A:
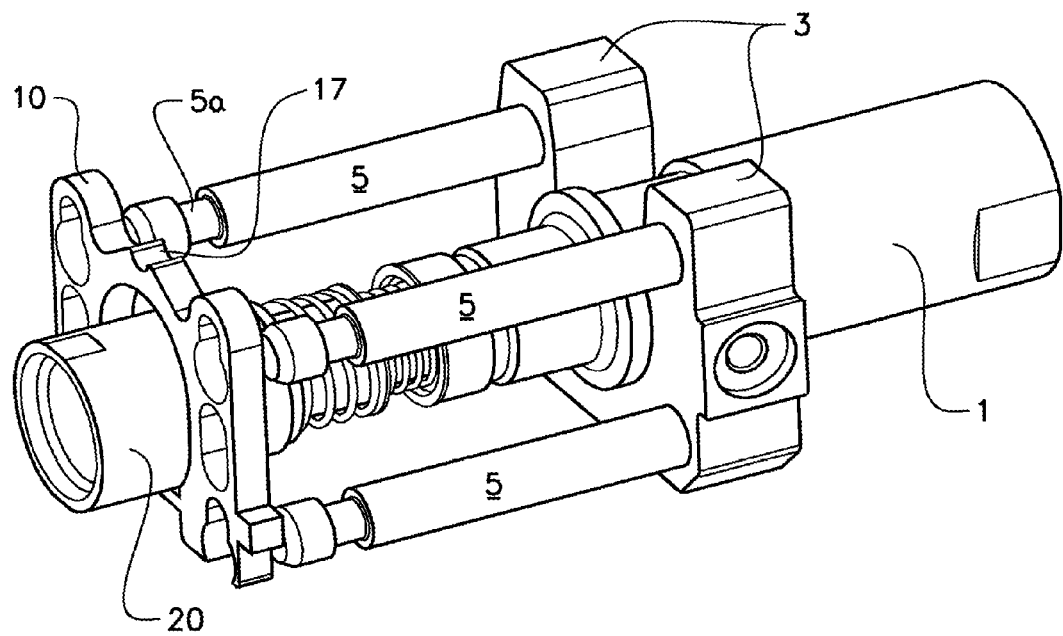
FIGS. 4A and 4B show decoupled and coupled views corresponding to views FIGS. 1A and 1B respectively but in the reverse direction and not showing the socket box or the lever mechanism.
Figure 4B:
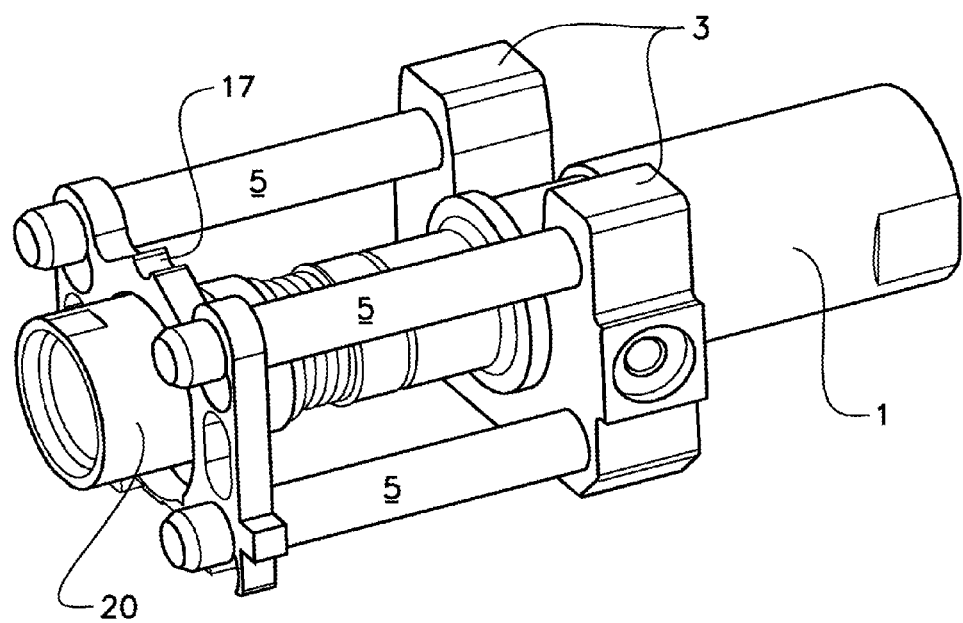

As best can be seen in FIGS. 2A-B and 4A-B the coupling is provided with four guide bolts 5 (only two shown in FIGS. 2A-B) which are solidly fixed in the yoke 3 and extend in bores through the socket box 2. These guide bolts 5 are moved to the right through the socket box as seen in FIGS. 2A-B and to the left as seen in FIGS. 4A-B when the lever mechanism is actuated to pull the yoke 3 closer to the socket box 2.

A locking plate 10 is provided on the side of the socket box 2 opposite to the yoke and it is provided with four openings 11,12 each having a wider portion 11a, 12a and a narrower portion 11b, 12b. The lower openings 12 in this embodiment happen to be open downwards, this being an optional design choice. The locking plate is displacable between an upper position shown in FIGS. 1A, 2A, 3A, 4A and 5A and a lower position shown in FIGS. 1B, 2B, 3B, 4B and 5B. When in the upper position, the distal ends of the guide bolts 5 pass through the wider portions 11a, 12a of the openings in the guide plate as the yoke 3 is brought closer to the socket box 2.

Figure 3A:
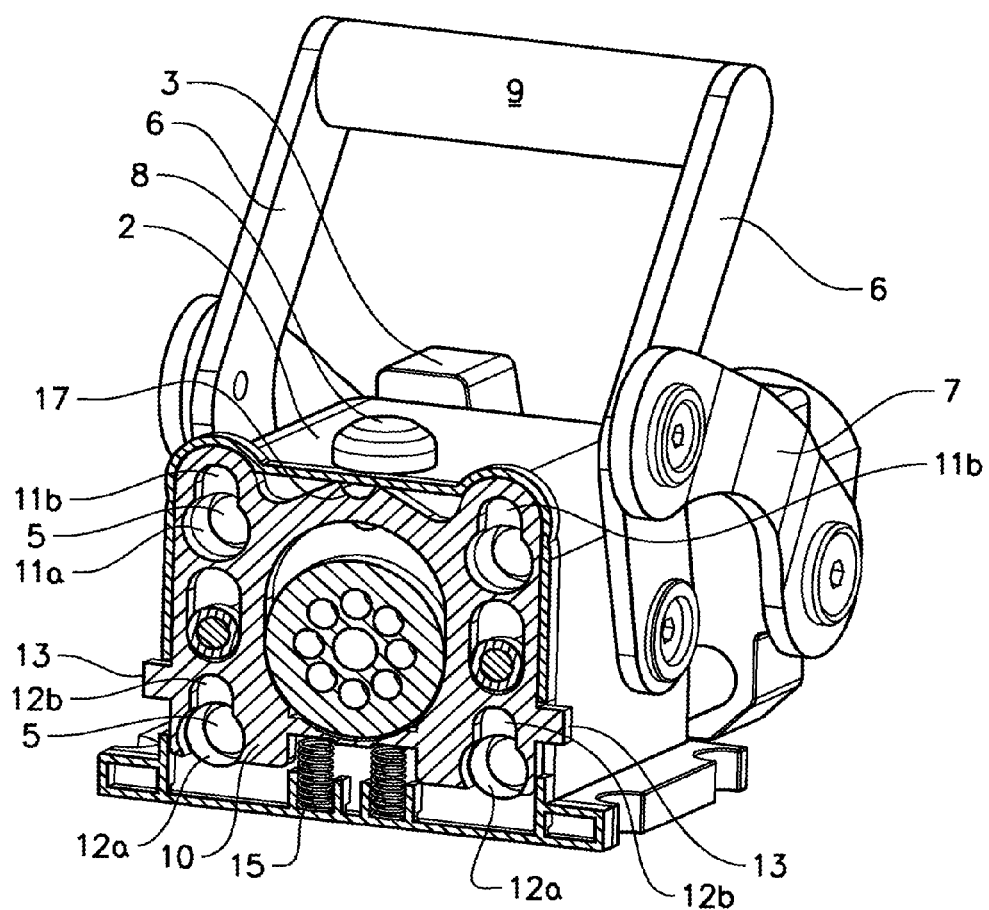
FIGS. 3A and 3B show cross sectional views in the decoupled and coupled states respectively as viewed in the direction of the arrows A in FIGS. 1A and 1B respectively.
Figure 3B:
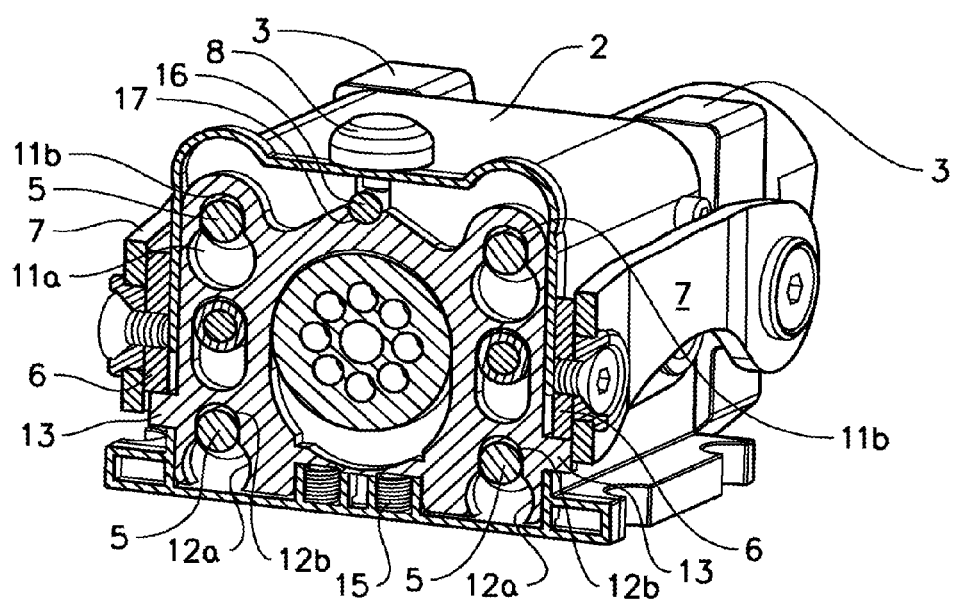

The locking plate 10 is provided with two lateral projections 13, both of which are visible in FIGS. 3A and 3B. The lateral projections 13 extend through holes 14 in the sides of a cover 24 to the socket box 2. When the lever 6 and the arm 7 have pulled the distal ends of the guide bolts through the wider portions of the openings 11, 12 in the locking plate, the locking phase of the lever actuation takes place when the lever 6 has rotated enough to begin a downward movement and come into contact with the lateral projections 13. This final downward movement of the lever will push the locking plate downwards as indicated inter alia by the arrow B in FIG. 2A. Each of the guide bolts is provided near its distal end with a neck portion 5a of narrower diameter which corresponds to the width of the narrower portion 11b, 12b of each opening 11, 12 in the locking plate 10. As the locking plate is pushed downwards it locks each guide bolt 5 axially by fitting over the narrow neck 5a of each guide bolt.

Figure 5A:
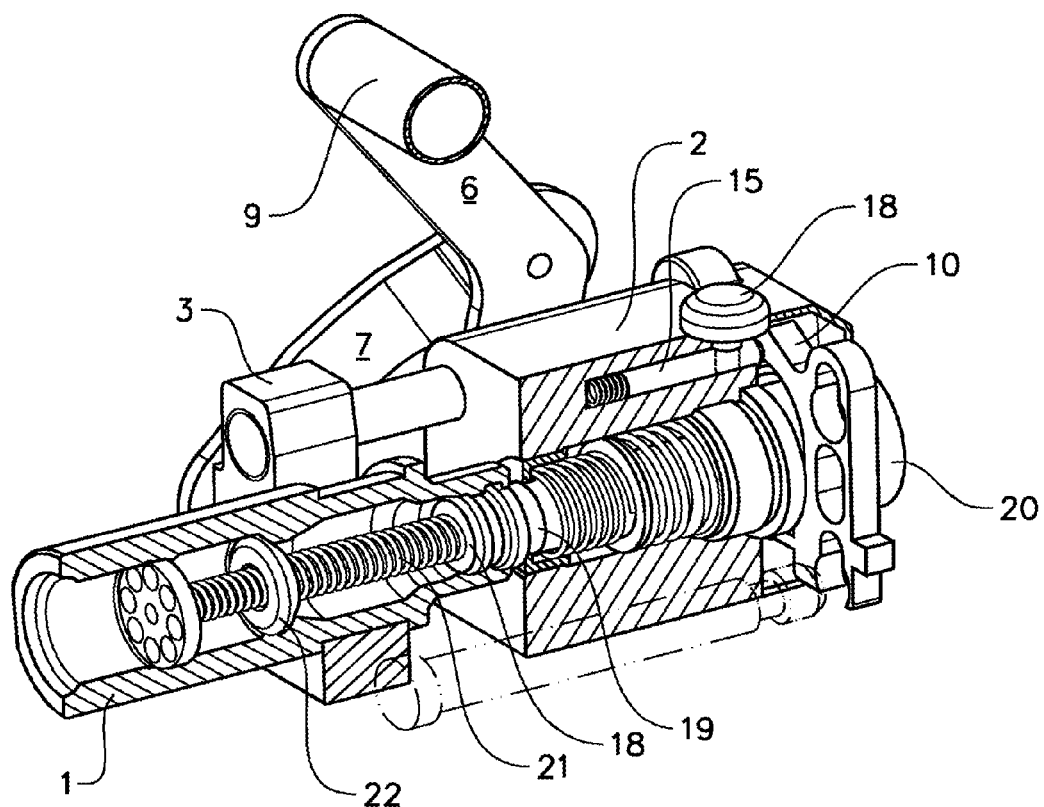
FIGS. 5A and 5B show views corresponding to FIGS. 4A and 4B respectively but showing the lever mechanism, the socket box and the nipple in longitudinal section.
Figure 5B:
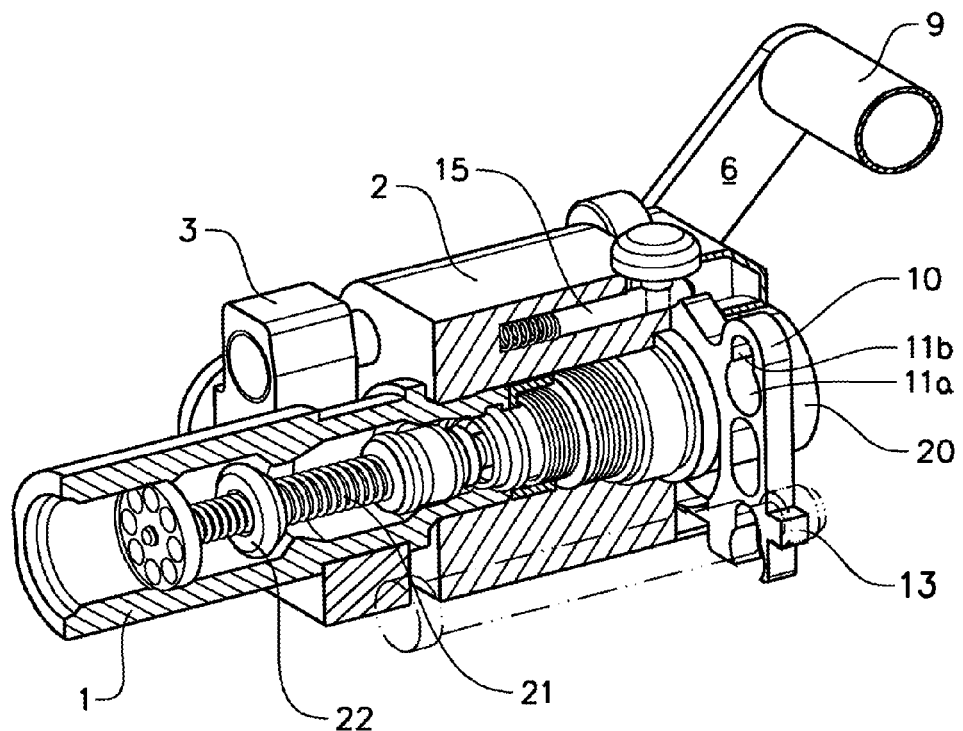

As can best be seen in FIGS. 3A and 3B this downward movement of the locking plate 10 is made against the force of two compression springs 15. When the locking plate has been pushed down to its final downward position (FIGS. 1B, 2B, 3B, 4B and 5B), a lock pin 16, which is biased to the right as shown in FIGS. 5A and 5B by a compression spring (not shown), moves into the notch 17 on the top of the locking plate, thereby holding the plate in its locking position. The lock pin 16 is connected to a knob 8.

When in this locking position, the locking plate 10 which rests flush against the wall of the socket box 2, the guide bolts 5 and the yoke 3 take up the extreme force attempting to separate the nipple 1 from the socket box 2 due to the high hydraulic fluid pressure in the hoses. In this case the force is evenly distributed by the locking around the central axis of the socket box, normal to this axis, and is not absorbed, as it otherwise would be, by the joints and arms of the lever mechanism 4, giving rise to shear stresses and eventual failure.

For decoupling, the locking plate is released by pushing the knob 8 towards the yoke 3, thereby moving the lock pin 16 out of engagement with the locking plate 10, allowing the lock plate 10 to move upwards by the force of the springs 15 if the lever 6 is raised. The lever 6 is then moved to its original position as shown in FIGS. 1A, 2A, 3A, 4A and 5A and the nipple can be removed from the yoke.

The nipple 1 is provided with a spring biased central plug 18, which prevents escape of pressurized fluid when the nipple is not coupled into the socket. As it is coupled into the socket of the socket box 2, a central projection 19 on a hose connected portion 20 pushes against the plug 18, thereby pushing the valve element 18 from its seat. A compression spring 21 connects plug 18 to a second valve element 22 which is also immediately unseated if the back pressure in the supply hose to the nipple 1 is not excessive. Should the supply hose connected to the nipple 1 have excessive residual pressure therein, perhaps due to a black hose lying in the sun, the movement of the plug 18 eventually actuates a tiny central venting valve (not visible here) which vents out the overpressure in the hose, enabling full opening the fluid connection between the nipple and the socket when the nipple is fully engaged.

It will be understood that other configurations of the components are possible within the scope of the claims. For instance a locking plate could be arranged to be flush against the yoke instead, where the guide bolts would be fixed solidly in the socket box and extend through bores in the yoke and have narrower neck portions at their ends penetrating the yoke. This would preserve the same general inventive principle of the locking plate and distribution of the load. It is also conceivable that the locking plate could move in a rotary direction, instead of downwards, being actuated by a single side projection, with the openings for the pins being oriented in rotary alignment instead and the lock plate being spring biased for rotational movement instead of vertical movement.

It is conceivable as well that two hoses stacked on top of each other can be coupled using the same yoke, made twice as high as in the illustrated embodiment. This single yoke, with a single lever mechanism and a single socket box, but with two sockets, and a single locking plate can achieve secure coupling of two hoses with a single operation prior to turning on the high pressure in the supply hose. The single locking plate, lying flush against the socket box, will then take up the extreme force in both hoses tending to decouple them from their sockets. The two hoses can also conceivably be arranged side-by-side in a double yoke, all according to the principle of the invention. Any practical multiple number of hoses is also conceivable.

The invention claimed is:

1. A fluid coupling assembly comprising:
   a hose nipple with a distal flange and a nipple neck, the nipple neck of a narrower diameter than a diameter of the distal flange,
   a box having a socket into which the hose nipple fits upon coupling,
   a yoke, which is open to one side, is of a narrower inner diameter than said diameter of the distal flange and can receive and hold said nipple neck,
   a lever mechanism actuatable to pull said yoke axially from an open extended position toward said box to a closed retracted position, to pull said hose nipple, when the nipple neck is held in said yoke, into full engagement with said socket, further including:
   a plurality of guide bolts, each of the guide bolts having a guide bold axis, the guide bolt axis for each of the guide bolts being substantially parallel to every other one of the guide bolt axis, each guide bolt axis being substantially parallel to and symmetrically distributed about a central axis of the fluid coupling assembly, wherein the central axis is parallel to a longitudinal axis of the hose nipple when assembled, and wherein each of the plurality of guide bolts is fixed to the yoke and extends through the box;
   a locking plate located on an end of the box opposite the yoke, the locking plate movable perpendicular to said central axis between an unlocked position permitting axial movement of said guide bolts and a locking position locking each of the guide bolts from axial movement, wherein the locking plate directly engages each of the plurality of guide bolts when the locking plate is in the locking position and thereby locking said hose nipple in full engagement with said socket.

2. The assembly according to claim 1, wherein said guide bolts are solidly fixed to said yoke and extend through said box.

3. The assembly according to claim 2, wherein the locking plate is disposed on a side of the box facing away from said yoke.

4. The assembly according to claim 1, wherein said locking plate is disposed to be moved to the locking position when the lever mechanism has pulled the yoke to the closed retracted position.

5. The assembly according to claim 4, wherein the lever mechanism moves said locking plate from the unlocked position to the locking position subsequent to pulling the yoke to the closed retracted position and the hose nipple to full engagement with the socket.

6. The assembly according to claim 1, wherein a fluid pressure acting to separate the hose nipple from the socket is absorbed by the guide bolts and the locking plate when in the locking position and not by the lever mechanism.

7. The assembly according to claim 6, wherein a lock pin holds said locking plate in the locking position.

8. The assembly according to claim 7, wherein said lock pin is operable to be displaced manually against a spring bias to release the locking plate from the locking position.

9. The assembly according to claim 1, wherein each of the guide bolts includes a distal end, wherein proximate to the distal end of each of the guide bolts is provided a narrower neck portion, the narrower neck portion operable to engage the locking plate when the locking plate is moved to the locking position.

10. The assembly according to claim 9, wherein the locking plate is provided with a plurality of openings, each of the plurality of openings operable to receive the distal end of one of the plurality of guide bolts, each of the plurality of openings having a wider portion allowing insertion of the distal end of one of the guide bolts therethough when the locking plate is in the unlocked position and a narrower slot portion operable for grasping the narrower neck portion of one of the guide bolts when the locking plate is in the locking position.

\* \* \* \* \*